(12) United States Patent
Cha

(10) Patent No.: US 7,233,460 B2
(45) Date of Patent: Jun. 19, 2007

(54) ULTRA-LOW FLYING HEIGHT SLIDER DESIGN

(75) Inventor: Ellis T. Cha, San Ramon, CA (US)

(73) Assignee: SAE Magnetics (H.K.) Ltd., Kwai Chung, N.T. (HK)

( * ) Notice: Subject to any disclaimer, the term of this patent is extended or adjusted under 35 U.S.C. 154(b) by 0 days.

(21) Appl. No.: 10/614,217

(22) Filed: Jul. 8, 2003

(65) Prior Publication Data

US 2005/0010684 A1 Jan. 13, 2005

(51) Int. Cl.
*G11B 21/21* (2006.01)
(52) U.S. Cl. ..................................... 360/236
(58) Field of Classification Search ............. 360/236.3, 360/235.4, 235.6, 235.7, 235.8, 235.9, 236, 360/236.1, 236.2, 236.6
See application file for complete search history.

(56) References Cited

U.S. PATENT DOCUMENTS

| 6,556,381 B2 * | 4/2003 | Kohira et al. ............. 360/236.3 |
| 6,594,113 B2 * | 7/2003 | Rao et al. ................. 360/235.8 |
| 6,628,480 B2 * | 9/2003 | Kohira et al. ............. 360/235.6 |
| 6,678,119 B1 * | 1/2004 | Pendray et al. ........... 360/236.6 |
| 2003/0218832 A1 * | 11/2003 | Tsuchiyama et al. .... 360/235.8 |
| 2004/0090709 A1 * | 5/2004 | Mundt et al. ............. 360/236.3 |
| 2004/0212929 A1 * | 10/2004 | Otsuka ..................... 360/235.7 |

* cited by examiner

*Primary Examiner*—Tianjie Chen
(74) *Attorney, Agent, or Firm*—Kenyon & Kenyon

(57) ABSTRACT

A subambient pressure air bearing slider for disk drives and the like is presented where features of the slider are modular, in that certain parameters of the slider can be modified independently of one another. In one example, lateral dimensions and placement of side and trailing air bearing surfaces can be used to control flying height sensitivity due to crowning in the slider. Longitudinal dimensions of the side air bearing surfaces can be used to control flying height sensitivity due to camber in the slider body. Low-profile members (e.g., ones that do not form air bearing surfaces) may be used to control the dimensions of the subambient pressure region to control overall flying height.

23 Claims, 6 Drawing Sheets

ULTRA-LOW FLYING HEIGHT SLIDER DESIGN

FIELD OF THE INVENTION

The present invention is directed to air bearing slider designs in disk drives. More particularly, the present invention pertains to a modular design for an air bearing surfaces of a slider to achieve an ultra-low flying height.

BACKGROUND OF THE INVENTION

Hard disk drives are common information storage devices essentially consisting of a series of rotatable disks that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing. The ABS of a slider is generally configured on the slider surface facing the rotating disk, and greatly influences its ability to fly over the disk under various conditions.

Some of the major objectives in ABS designs are to fly the slider and its accompanying transducer as close as possible to the surface of the rotating disk, and to uniformly maintain that constant close distance regardless of variable flying conditions. The height or separation gap between the air bearing slider and the spinning magnetic disk is commonly defined as the flying height. In general, the mounted transducer or read/write element flies only approximately a few micro-inches above the surface of the rotating disk. The flying height of the slider is viewed as one of the most critical parameters affecting the magnetic disk reading and recording capabilities of a mounted read/write element. For example, there are many advantages for reducing or having a relatively small flying height. A relatively small flying height allows the transducer to achieve greater resolution between different data bit locations and magnetic fields emanating from closely defined regions on the disk surface. Also, a low flying slider is known to provide improved high density recording or storage capacity of magnetic disks which is usually limited by the distance between the transducer and the magnetic media. Narrow separation gaps permit shorter wavelength signals to be recorded or read as a result. At the same time, with the increasing popularity of lightweight and compact notebook type computers that utilize relatively small yet powerful disk drives, the need for a progressively smaller slider body with a lower flying height has continually grown.

It has also been observed that a constant flying height provides desirable benefits which may be more readily achieved through particular ABS designs. Fluctuations in flying height are known to adversely affect the resolution and the data transfer capabilities of the accompanying transducer or read/write element. The amplitude of the signal being recorded or read does not vary as much when the flying height is relatively constant. Additionally, changes in flying height may result in unintended contact between the slider assembly and the magnetic rotating disk. Sliders are generally considered to be either direct contacting, pseudo-contacting or flying sliders which is descriptive of their intended contact with a rotating disk. Regardless of the type of slider, it is often desirable to avoid unnecessary contact with the surface of the spinning magnetic disk so as to reduce the wear on both the slider body and the disk. The deterioration or wear of the recording media may lead to the loss of recorded data, while slider wear may also result in the ultimate failure of the transducer or magnetic element.

What often causes changes to the flying height is the continual high speed movement of the slider across the rotating disk while performing read or write operations. For example, depending on the radial position of the slider, the respective linear velocity of the disk varies. Higher velocities are observed at the outer edge of the rotating disk, while lower velocities are found at the inner edge. As a result, the air bearing slider flies at different relative speeds at different radial positions relative to the disk. Because sliders typically fly higher at higher velocities, there is a tendency for flying heights to increase when positioned above the outer regions of the disk. At the same time, lower velocities at the inner regions of the disk cause the slider to fly lower. Accordingly, slider designs must account for the noticeable effect that variations in radial position, and relative velocity, have on the flying height.

The flying height of a slider is also adversely affected by changes in skew. The skew angle is defined and measured as the angle formed between the longitudinal axis of the slider body and the direction of the air flow tangential to the disk rotation. When the mounted slider is positioned near the inner or outer edges of the spinning disk, its longitudinal axis is often skewed in relation to the direction of the air flow. The longitudinal axis of the slider may be defined as a center line of reference running along the length of the slider body. These angular orientations or skew angles typically vary as a rotary actuator arm and gimbal suspension assembly turns about its pivot point thereby moving the slider in an arcuate path across the rotating disk. In view of the growing demand for compact disk drives having relatively smaller actuator arms, larger skew angles are ever more present because of the shortened arm length. It has often been observed that at skew values above zero, sliders are pressurized at reduced values which cause an undesirable decrease in flying height. Even a relatively moderate skew angle range adversely affects the flying capabilities of a slider. As a result, ABS designs continually attempt to minimize slider sensitivity to changes in skew.

Another fluctuation in flying height may be identified as slider roll. The roll angle is measured and defined by the difference in flying height between the longitudinal sides of the slider. Whenever a slider flies at skew with respect to the direction of the air flow, an unequal pressure distribution tends to occur between the ABS and the disk. This imbalance causes slider roll where one side of the slider body is closer to the disk surface than the other side. A slider, however, is preferably positioned at a constant slider roll regardless of any changes in the flying conditions including differences in tangential velocity between the inner and outer tracks of the rotating disk, and continuous lateral movement above the surface of the disk or varying skew angles.

As shown in FIG. 1 an ABS design known for a common catamaran slider 5 may be formed with a pair of parallel rails 2 and 4 that extend along the outer edges of the slider surface facing the disk. Other ABS configurations including three or more additional rails, with various surface areas and geometries, have also been developed. The two rails 2 and 4 typically run along at least a portion of the slider body length from the leading edge 6 to the trailing edge 8. The leading edge 6 is defined as the edge of the slider that the rotating disk passes before running the length of the slider 5 towards a trailing edge 8. As shown, the leading edge 6 may be tapered despite the large undesirable tolerance typically associated with this machining process. The transducer or magnetic element 7 is typically mounted at some location along the trailing edge 8 of the slider as shown in FIG. 1. The rails 2 and 4 form an air bearing surface on which the slider flies, and provide the necessary lift upon contact with the air flow created by the spinning disk. As the disk rotates, the generated wind or air flow runs along underneath, and in between, the catamaran slider rails 2 and 4. As the air flow passes beneath the rails 2 and 4, the air pressure between the rails and the disk increases thereby providing positive pressurization and lift. Catamaran sliders generally create a sufficient amount of lift, or positive load force, to cause the slider to fly at appropriate heights above the rotating disk. In the absence of the rails 2 and 4, the large surface area of the slider body 5 would produce an excessively large air bearing surface area. In general, as the air bearing surface area increases, the amount of lift created is also increased. Without rails, the slider would therefore fly too far from the rotating disk thereby foregoing all of the described benefits of having a low flying height.

As illustrated in FIG. 2, a head gimbal assembly 40 often provides the slider with multiple degrees of freedom such as vertical spacing, or pitch angle and roll angle which describe the flying height of the slider. As shown in FIG. 2, a suspension 74 holds the HGA 40 over the moving disk 76 (having edge 70) and moving in the direction indicated by arrow 80. In operation of the disk drive shown in FIG. 2, an actuator 72 moves the HGA over various diameters of the disk 76 (e.g., inner diameter (ID), middle diameter (MD) and outer diameter (OD)) over arc 78.

Although catamaran sliders are initially effective in providing an adequate flying height, they are especially sensitive to varying skew angle ranges and other adverse flying conditions. When the skew angle is increased, such as when the flying slider moves across the rotating disk, the air pressure distribution beneath the rails may become distorted. By accessing both inner and outer portions of a disk at relatively high speed, air is introduced in an uneven amount under each rail which typically causes slider roll as depicted in FIG. 1. As a result, the slider experiences an uneven distribution of pressure which may cause the slider to roll in one direction such that the flying height is not uniform between the ABS rails. The mounted transducer may therefore be unable to operate effectively or accurately perform its data transfer operations. Regardless of the sensitivity of the ABS rails to various skew ranges and other adverse flying conditions, this rail design is widely acknowledged as a general configuration that provides effective pressurization or lift to enable a slider to fly.

In order to counteract the positive pressurization of the flying slider body to provide a low and constant flying height, it is known to form an ABS that also provides negative or subambient pressurization to pull or draw the slider body towards the disk. For example, negative pressure air bearing (NPAB) or self loading sliders have been known to provide a counteracting negative pressure load. In this dual pressurization scheme, the ABS may be generally formed with a leading edge, a trailing edge, side rails, and a cross-rail that extends between the side rails in a basic H-shaped orientation. The cross-rail, which is often positioned closer to the leading edge than the trailing edge of the slider, creates a subambient pressure region trailing the cross-rail and in between the side-rails. The subambient pressure region creates a negative pressure or load that counteracts the positive pressure generated along the side rail portion of the ABS. This counteraction of negative and positive forces has been known to increase the stability and air bearing stiffness of the slider, provide rapid slider take-off, and reduce its sensitivity to variations in conditions such as changing disk velocity and radial movement which cause fluctuations in flying height. The compensating changes in positive and negative pressure, in accordance with the varying velocity between the inner and outer tracks of the disk, contributes to the overall objective of maintaining a substantially constant and steady flying height. However, the offsetting forces created in a subambient pressurization scheme may often present undesirable effects that actually cause variations in flying height. A NPAB slider often exhibits noticeable roll as well, and a reduction in flying height at skewed conditions because of unequal pressurization or distribution of air beneath the rails.

All of the aforementioned ABS configurations and modifications for air bearing sliders attempt to achieve a low and constant flying height. Different degrees of effectiveness are provided by these ABS designs which overall do not control flying height, or pitch and roll angles very well. For example, many existing ABS designs have been observed to exhibit an extremely increased slider roll angle over outer tracks regions of a disk. These configurations also typically fail to control the increase in slider pitch angle when moving from inner track to the outer track regions.

Recording density for hard disks has increased over time necessitating a lower flying height for the air bearing slider. In the art, a flying height of less than 10 nm is referred to as an ultra-low flying height. As described above, one problem seen with lower flying heights is that there is more of a risk for head/disk contact, which can cause damage to the slider head and/or the magnetic recording disk. In view of this, there is a need for an ABS design, in particular for ultra-low flying height implementations that is both robust and stable. Robust in that the ABS design has a flying height that is stable and insensitive to external variations such as manufacturing tolerances, air properties, and environmental conditions (e.g., temperature).

SUMMARY OF THE INVENTION

The present invention provides a subambient pressure air bearing slider with a plurality of air bearing surfaces (ABSs) that provide an ultra-low and constant flying height even in varying temperature environments. The design may be referred to as "modular" in that individual parameters for the slider, such as crown, camber, and sub-ambient pressure, may be separately controlled through the dimensions and placement of the various components of the slider. In other words, controlling one of these parameters may be effectively "decoupled" from other affecting others of these parameters. For example, crown sensitivity of the slider may be controlled by controlling the length and placement of side ABS structures in addition to altering the dimensions of a trailing ABS. Camber sensitivity may be controlled by setting the width of the side ABS structures. Finally, once camber and crown sensitivity for the slider are set, overall flying height for the slider may be set by appropriate placement of low-profile members creating a sub-ambient pressure region between them, resulting in a lower flying height for the slider.

DETAILED DESCRIPTION OF THE INVENTION

Figure 1:
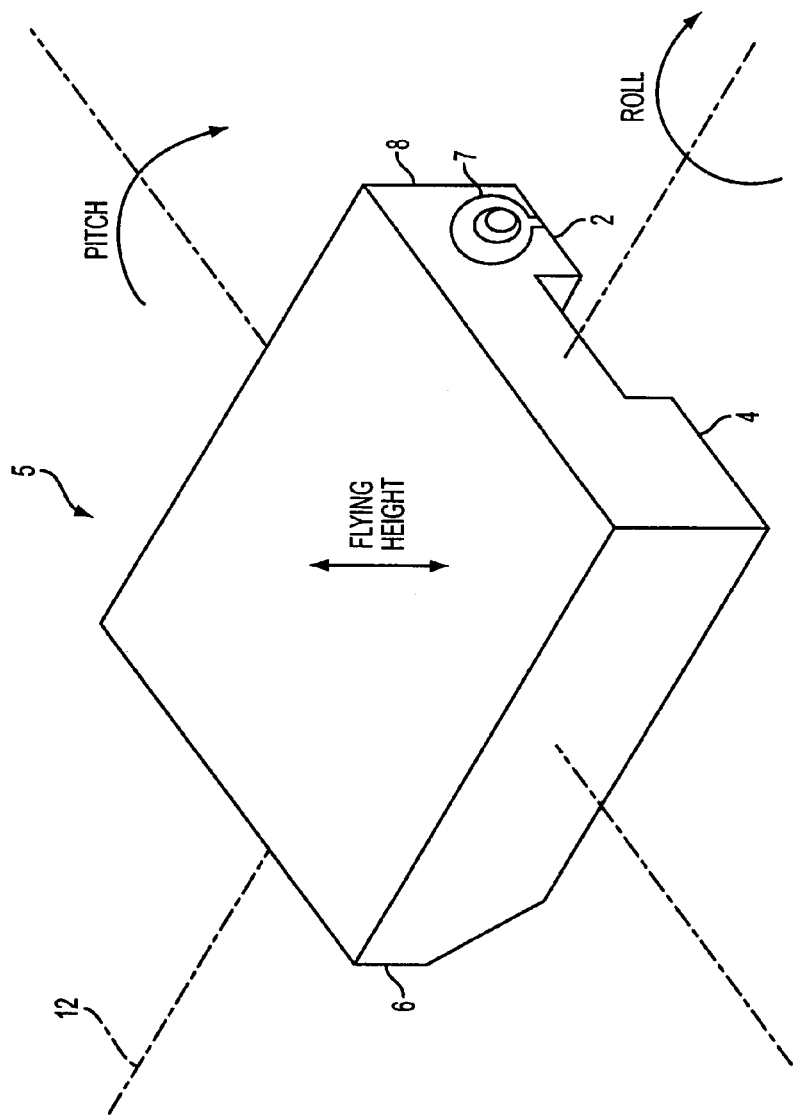
FIG. 1 is a perspective view of a flying slider with a read and write element assembly having a tapered conventional catamaran air bearing slider configuration.
Figure 2:
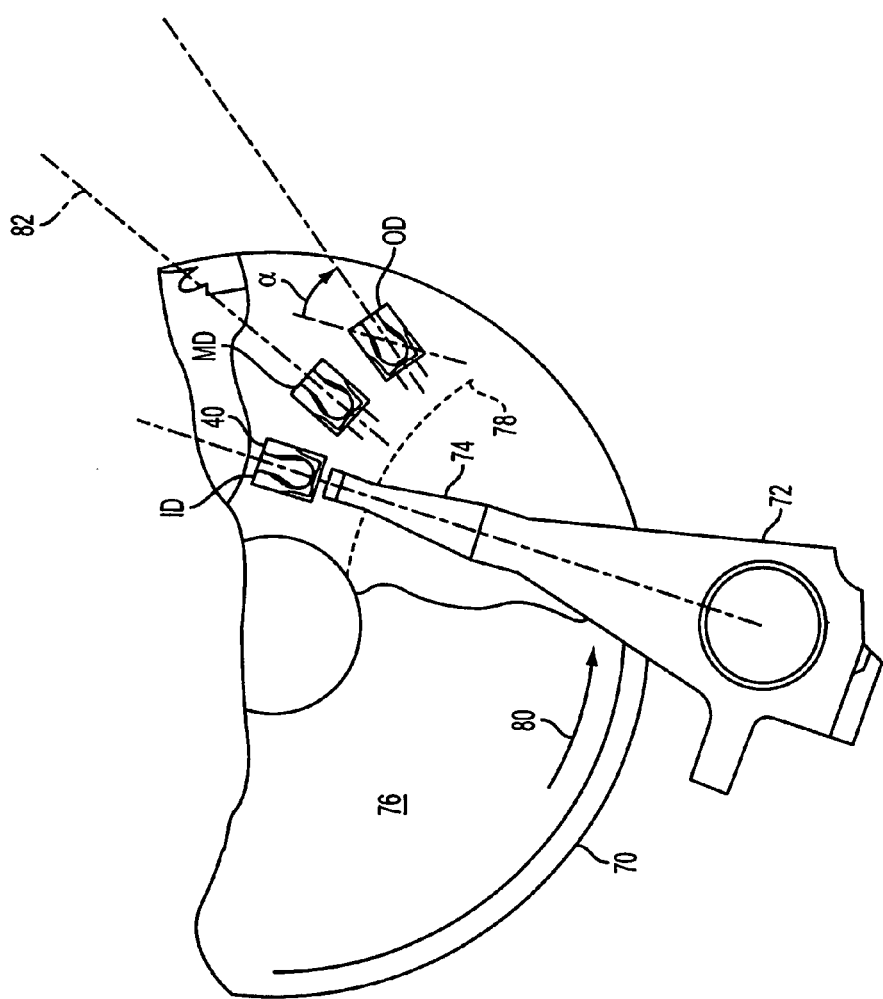
FIG. 2 is a plan view of a mounted air bearing slider in accordance with the present invention (not drawn to scale).
Figure 3:
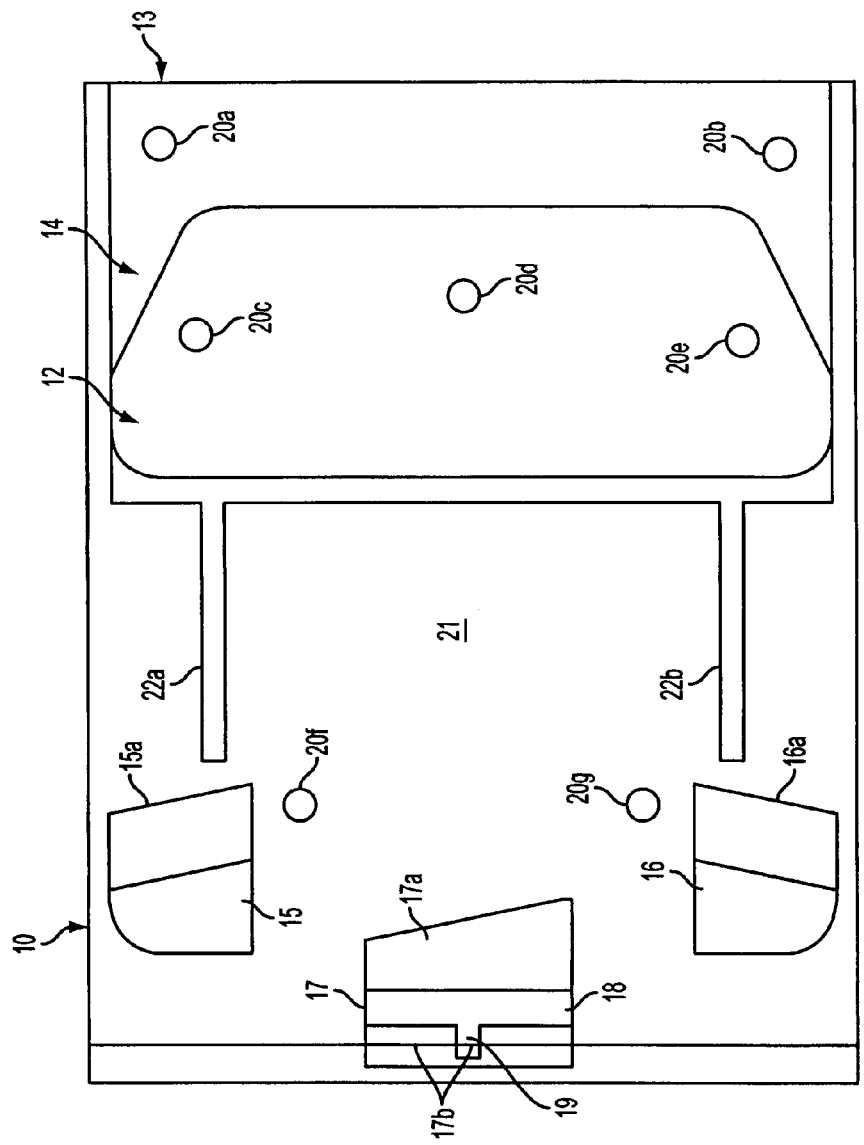
FIG. 3 is a bottom plan view of a subambient pressure slider constructed according to a an embodiment of the present invention.

FIG. 3 is a plan view of the bottom side of a slider 10 for a subambient pressure slider in accordance with an embodiment of the present invention. It will be understood that for purposes of describing particular features of an ABS as follows, the entire slider body, which may be formed from a substrate material such as $Al_2O_3TiC$, is not shown. The slider 10 illustrated in FIG. 3 includes a leading air bearing surface 12. Air bearing surface is set off from a leading edge 13 of the slider 10 by a leading step 14. In this embodiment, the leading step 14 has a depth relative to the leading air bearing surface 12. In this embodiment the depth is between 2 and 10 microinches. Two side air bearing surfaces 15, 16 are provided at the inner and outer edges of the slider 10. Though two such surfaces are provided, the present invention is not limited to this number. Each of the air bearing surfaces 15, 16 includes a secondary structure 15a, 16b, respectively that is at a lower height. In this embodiment, the secondary structures 15a–16b are at a height equal to the height of the leading step 14. A trailing air bearing surface 17 is provided at a trailing edge of the slider 10. The air bearing surfaces are at the same height in this embodiment. Air bearing surface 17 includes a first rectangular surface 18 that is relatively larger than a trailing rectangular surface 19 (described in more detail below). In this embodiment, the trailing air bearing surface 17 has secondary structures 17a and 17b, which are at the same height as secondary structures 15a, 16a. The secondary structures 15a, 16a, 17a as well as the leading step 14 provide pressurization for incoming air and a lifting force for the slider 10. A magnetic recording device or head is located in the slider body at its trailing edge (not shown specifically in FIG. 3).

A number of stiction reduction pads 20a–g may be provided that extend higher than the air bearing surfaces. The stiction reduction pads may be made from the same material as the slider body and include a diamond-like-carbon material at its ends to reduce starting friction forces and prevent damage to the air bearing surfaces and other components of the slider.

Slider 10 includes a negative pressure area 21 which is contained by the leading edge step 14 and/or leading air bearing surface 12 along with low-profile bars 22a and 22b. In this embodiment, the low-profile bars 22a–b have a relative narrow width (e.g., between 30 and 60 micrometers). Also, in this embodiment, the height of the low-profile bars is the same as the leading edge step 14 and secondary structures 15a, 16a, 17a of the side and trailing ABSs.

The design of the slider of FIG. 3 can be considered somewhat "modular" in design, in that there are at least three elements whose dimensions can be separately selected to address different aspects of the slider's characteristics.

For example, crown or crowning is a characteristic of a slider. It refers to the curvature of the air bearing surfaces from the leading edge to the trailing edge of the slider. First rectangular surface 18 is designed to be narrow with respect to the length of the slider 10 and wide with respect to the side-to-side dimension of the slider. Second rectangular surface is designed to be very narrow (e.g., on the order of the mask alignment tolerances of the fabrication processes; e.g., 5 mils (millionths of an inch) or 130 microns (or micrometers)). Since the trailing ABS 17 provides such a high pressure region, reducing the width of the second rectangular surface 19, reduces the flying height of the slider so that it can get below the 10 nm threshold for ultra low flying. Because the region is so narrow, the chance of this area contacting the recording medium is greatly reduced. Even when contact occurs, the contact area would be very small resulting in minimal damages to the read/write element under it as well as the slider itself.

Figure 4:
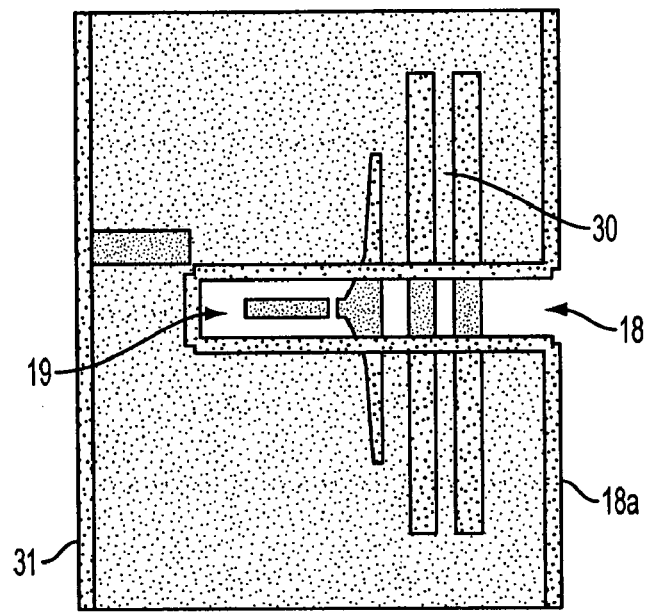
FIG. 4 is a plan view of a portion of the trailing air bearing surface of FIG. 3.

An enlarged view of the second rectangular surface 19 is shown in FIG. 4. The second rectangular area begins at the trailing edge 18a of the first rectangular area towards the trailing edge 31 of the slider. As seen in FIG. 4, the width of the second rectangular area 19 can be smaller than the width of portions of the read/write element 30. Accordingly, during the etching operation to create the second rectangular area 19, care must be taken to prevent damage to the components of the read/write element 31 either through etching or through corrosion. Controlling the dimensions of the trailing ABS 17, the slider can be made so as to lower the sensitivity to crowning in the slider. First, since crowning is a length-wise parameter for the slider, a narrow air bearing surface induces minimal flying height changes with respect to the changes in the curvature of the ABS surface. Second, the leading portion of the trailing ABS 17 is substantially flat, which also lowers sensitivity of the flying height of the slider due to crowning.

Referring back to FIG. 3, side air bearing surfaces 15 and 16 provide roll stiffness to the slider during operation. The dimensions of these ABSs, not only effect the slider's sensitivity to crown, but also affect sensitivity to a second parameter of the slider, camber (or also known as cross-crown). Camber refers to curvature in the slider between lateral sides of the slider body. In particular, the side-to-side width of the side ABSs 15, 16 make the slider more sensitive to camber. Also the front to trailing edge width of the side ABSs 15, 16 make the slider more sensitive to crown. The placement of the side ABSs 15, 16 has an affect on overall flying height. The closer these pads are to the trailing edge of the slider, the more load-bearing they become resulting in a higher flying height. In addition, the two side ABSs contribute in determining the overall flying height sensitivity to the changes in altitude for the disk drive.

Figure 5:
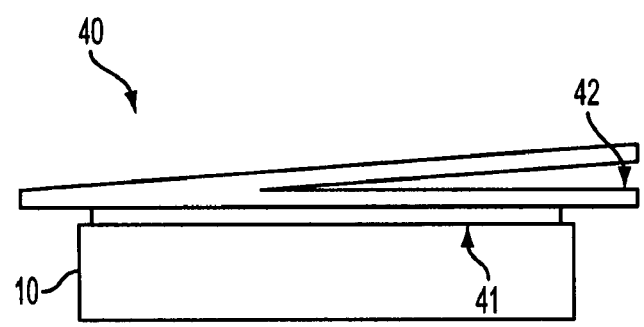
FIG. 5 is a side view of head flexure assembly including the slider of FIG. 3.

Based on the above, it can be seen that control of the placement and dimensions of the trailing ABS 17 and the side ABSs 15, 16 can be used to control the effect on the flying height of the slider due to camber and crown. The amount of camber and crown that will be seen in a slider is directly related to the operating environment for the slider. Referring to FIG. 5, a side view of a head gimbal assembly 40 is shown. In FIG. 5, a slider 10 is coupled to a flexure 42 via an epoxy 41. In this embodiment the epoxy is a combination of a standard epoxy and a conductive epoxy (e.g., a silver epoxy). The conductive epoxy forms a conductive path between the slider and the suspension. Due to the mismatch in the thermal expansion of the slider 10, epoxy 41 and the suspension material (typically made of stainless steel), changes in temperature cause changes to the slider profile (i.e., crown and camber).

At cold temperatures (e.g., 5° C.), crown and camber increase due to contraction of the flexure 42 material. At hotter temperatures (e.g., 60° C.), crown and camber decrease due to expansion of the flexure material. The effects on the flying height of the slider due to crown and camber are opposite to each other. As crown increases, the flying height for the slider increases, while increases in camber cause the flying height of the slider to decrease. Accordingly, the dimensions and placement of side ABSs 15 and 16 and the trailing ABS 17 can be controlled so that the flying height sensitivity of the slider to crown and camber can be made approximately equal to each other over a range of temperatures. In other words, at colder temperatures, the flying height increase of the slider that would be caused by the increase in crown is offset by the decrease in flying height of the slider that would be caused by the increase in camber. At higher temperatures, the flying height decrease of the slider that would be caused by the decrease in crown is offset by the increase in flying height that would be caused by the decrease in camber.

One potential requirement of an ultra-low flying height is that there be little to no change in flying height with change in altitude. Flying height change due to altitude change is highly correlated to the sub-ambient pressure region generated in the slider body. Referring back to FIG. 3, the sub-ambient pressure region exists between the low-profile bars 22a and 22b. In prior art designs, the sub-ambient pressure region is typically contained within side ABS rails. Accordingly, to reduce the subambient pressure area, the ABS rails would need to be expanded or moved, greatly affecting flying height. According to an embodiment of the present invention, the height of the low-profile bars 22a and 22b and their widths are selected so as not to provide air bearing surfaces, but still be sufficient to create a sub-ambient pressure region. In this example, the widths of the low-profile bars 22a and 22b are each set to 30 mils. Alternatively, their widths may be set to the photolithographic tolerances of manufacture as with the trailing edge ABS portion 19. Since the low profile bars are not air bearing surfaces, they need not be placed towards the side edges of the slider body, but instead can be moved inward towards the center of the slider body to reduce the suction force provided by the sub-ambient pressure area.

Figure 6A:
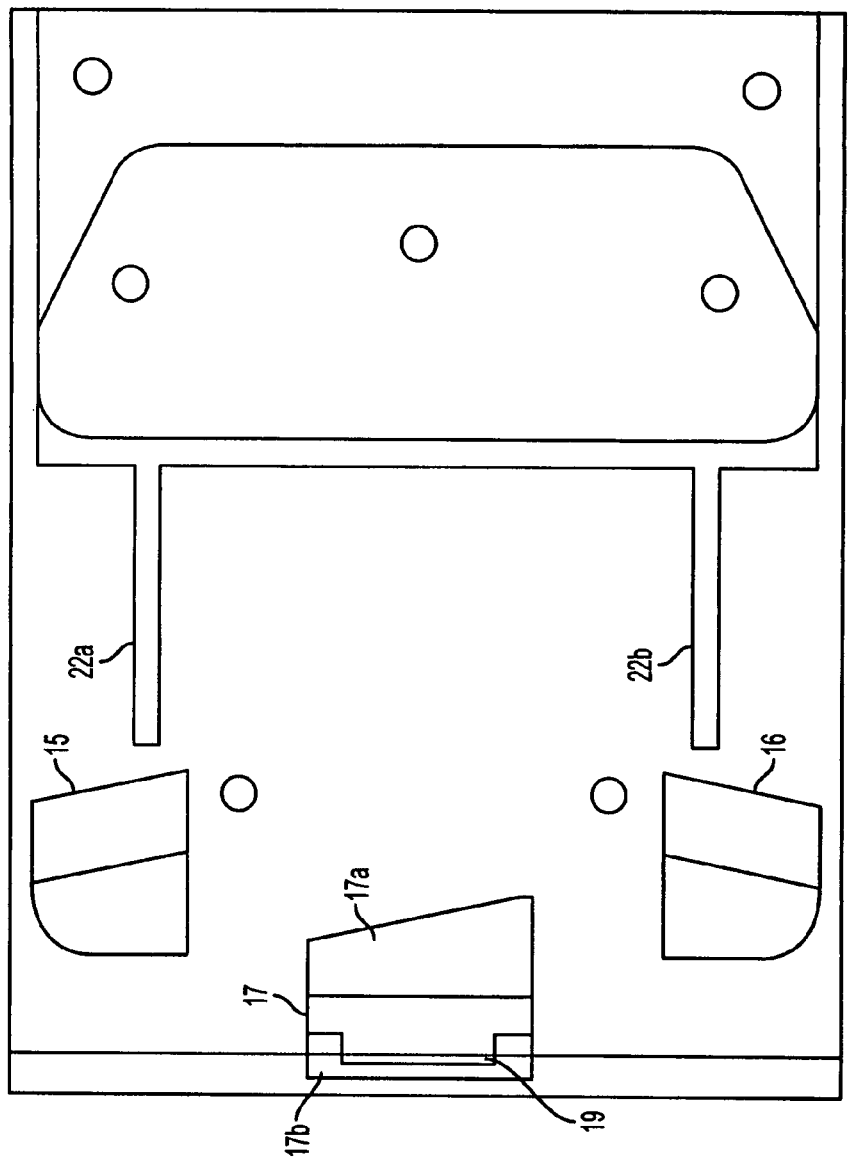
FIGS. 6a and 6b are alternative designs for the slider of FIG. 3 constructed according to embodiments of the present invention.
Figure 6B:
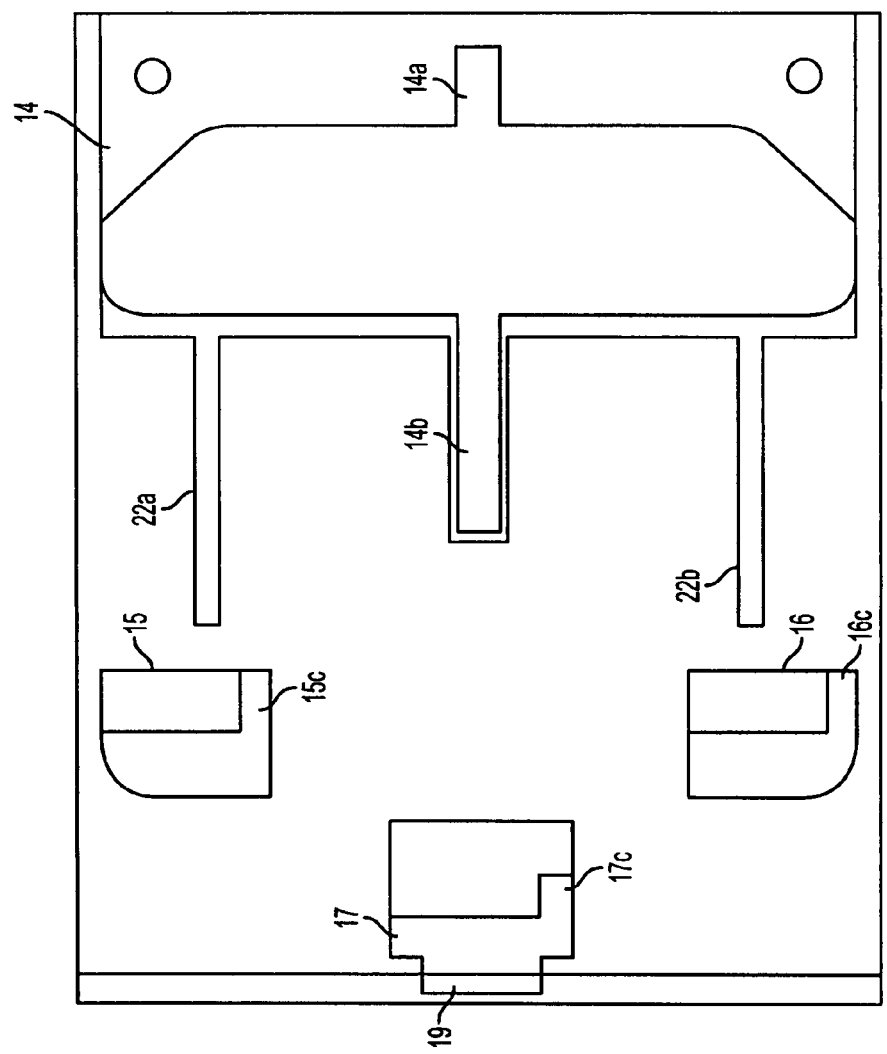

Referring to FIGS. 6a and 6b, additional embodiments of the present invention are shown. In FIG. 6a, the side ABSs 15, 16 are moved farther towards the trailing edge of the slider. Since the side ABSs are moved farther towards the trailing edge, these ABSs bear more load resulting in an increase in flying height for the slider. Also, the rear ABS 17 is made narrower, while the second rectangular section 19 is made wider when compared with the same structure in FIG. 3. The rear ABS 17 also includes a secondary structure 17b at the same height as the secondary structure 17a at the leading edge of the trailing ABS. Finally, the low-profile members 22a, 22b have been moved outward to increase the sub-ambient pressure area. As demonstrated in FIG. 6a, the sensitivity of the slider to camber has been increased when compared to FIG. 3 because of the side ABSs have been moved toward the trailing edge of the slider. Because the dimension of the side ABSs and the dimensions of the first section of the trailing ABS have not changed, the sensitivity of the slider to crown has not appreciably changed, thus demonstrating an example of how sensitivity to one parameter can be changed without affecting change in another parameter. In the example of FIG. 6a, once the camber/crown sensitivity is set, the overall flying height of the slider can be set independently via setting the separation of the low-profile bars and setting the width of the second rectangular section of the trailing ABS.

Referring to FIG. 6b, the slider design is changed again. In FIG. 6b, the leading ABS 14 includes a second portion 14a extending in a leading direction from the ABS and a third portion 14b extending in a trailing direction from the ABS. The third portion works to break up the sub-ambient pressure region subtended by the low-profile members 22a, 22b. The side ABSs 15, 16 are made narrower from the leading edge to the trailing edge resulting in a decrease in crown sensitivity. Once crown and camber sensitivity have been set, the overall flying height can be set by controlling the width of the second rectangular portion 19 of the trailing ABS 17 (e.g., by making it wider). Also, in this embodiment, the side ABSs 15, 16 and trailing ABS 17 include extensions 15c, 16c, 17c towards the leading edge of the slider. These extensions provide additional pressurization when the slider as at the inner diameters of the moving disc.

While the present invention has been described with reference to the aforementioned applications, this description of the preferred embodiments is not meant to be construed in a limiting sense. It shall be understood that all aspects of the present invention are not limited to the specific depictions, configurations or dimensions set forth herein which depend upon a variety of aerodynamic principles and variables, and may be determined, for example, through computer simulation procedures using computer simulation programs such as that developed at the Computer Mechanics Laboratory at the University of California, Berkeley, Calif. Various modifications in form and detail of the disclosed apparatus, as well as other variations of the present invention, will be apparent to a person skilled in the art upon reference to the present disclosure. It is therefore contemplated that the appended claims shall cover any such modifications or variations of the described embodiments as falling within the true spirit and scope of the present invention.

What is claimed is:

1. A subambient pressure air bearing slider comprising:
a slider body defined by a leading edge, an inner and outer edge extending longitudinally along the slider body, and a trailing edge, said slider body including
a leading air bearing surface;
a leading portion extending from the leading edge of the slider, said leading portion having a first height lower than a height of said leading air bearing surface; and
a subambient pressure region extending between the leading portion and between first and second low-profile members, said low-profile members having a height that is less than the height of said leading air bearing surface wherein a width of a side air bearing surface in a latitudinal direction of the slider is selected to reduce the flying height's sensitivity to changes in camber.

2. The subambient pressure air bearing slider of claim 1 wherein the height of said first and second low-profile members is equal to said first height.

3. The subambient pressure air bearing slider of claim 2 wherein said slider is to be used in an ultra low flying height environment for a disk drive.

4. The subambient pressure air bearing slider of claim 1 further comprising:
a trailing air bearing surface including a first rectangular portion facing the leading edge of said slider and a second rectangular portion facing the trailing edge of said slider.

5. The subambient pressure air bearing slider of claim 4 wherein said second rectangular portion has a width of less than approximately 30 mils.

6. The subambient pressure air bearing slider of claim 5 wherein said second rectangular portions has a width of approximately 5 mils.

7. The subambient pressure air bearing slider of claim 4 wherein a width of said second rectangular portion is limited to mask alignment tolerances in photolithographic process to manufacture said slider.

8. The subambient pressure air bearing slider of claim 4 further comprising:
a read/write element, wherein said second rectangular portion is disposed over said read/write element.

9. A subambient pressure air bearing slider comprising:
a slider body defined by a leading edge, an inner and outer edge extending longitudinally along the slider body, and a trailing edge, said slider body including
a leading air bearing surface;
a leading portion extending from the leading edge of the slider, said leading portion having a first height lower than a height of said leading air bearing surface;
a subambient pressure region extending between the leading portion and between first and second low-profile members, said low-profile members having a height that is less than the height of said leading air bearing surface; and
at least one side air bearing surface, wherein a placement of said side air bearing surface and a width of said side air bearing surface in the longitudinal direction of the slider are selected to reduce the flying height's sensitivity to changes in crowing.

10. The subambient pressure air bearing slider of claim 9 wherein the height of said first and second low-profile members is equal to said first height.

11. The subambient pressure air bearing slider of claim 10 wherein said silder is to be used in an ultra low flying height environment for a disk drive.

12. The subambient pressure air bearing slider of claim 9 further comprising:
a trailing air bearing surface including a first rectangular portion facing the leading edge of said slider and a second rectangular portion facing the trailing edge of said slider.

13. The subambient pressure air bearing slider of claim 12 wherein said second rectangular portion has a width of less than approximately 30 mils.

14. The subambient pressure air bearing slider of claim 13 wherein said second rectangular portions has a width of approximately 5 mils.

15. The subambient pressure air bearing slider of claim 12 wherein a width of said second rectangular portion is limited to mask alignment tolerances in photolithographic process to manufacture said slider.

16. The subambient pressure air bearing slider of claim 12 further comprising:
a read/write element, wherein said second rectangular portion is disposed over said read/write element.

17. The subambient pressure air bearing slider of claim 9 wherein said low-profile members are not air bearing surfaces.

18. A method of designing a subambient pressure air bearing slider including a slider body defined by a leading edge, an inner and outer edge extending longitudinally along the slider body, and a trailing edge, said slider body including a leading air bearing surface and a leading portion extending from the leading edge of the slider, said leading portion having a first height lower than a height of said leading air bearing surface, the method comprising:
selecting a width, in a longitudinal direction for the slider body, of a side air bearing surface and a position for said side air bearing slider to reduce the flying height's sensitivity to changes in crowning.

19. The method of claim 18 wherein said selecting operation further comprises selecting a width, in the longitudinal direction for the slider body, of a trailing air bearing surface to reduce flying height sensitivity to crowning in the slider.

20. The method of claim 19 further comprising:
selecting a width, in a lateral direction for the slider body, of said side air bearing surface to achieve a predetermined flying height sensitivity to camber in the slider.

21. The method of claim 20 wherein said flying height sensitivities to crown and camber offset each other for the slider.

22. The method of claim 20 further comprising:
positioning two low-profile members behind said leading air bearing surface and said leading portion to define a subambient pressure region.

23. The method of claim 22 wherein said trailing air bearing surface includes a leading rectangular portion and a trailing rectangular portion, the method further comprising:
selecting a width, in the lateral direction for the slider body, of said trailing rectangular portion of the trailing air bearing surface to achieve a desired flying height for said slider.

* * * * *